THERMOELECTRIC DEVICE

Filed Sept. 25, 1962

Inventors
WILHELM SCHNEIDER
OTTO BÖTTGER
By Toulmin & Toulmin
Attorneys

United States Patent Office 3,291,647

Patented Dec. 13, 1966

3,291,647

THERMOELECTRIC DEVICE

Wilhelm Schneider, Langenhagen Hannover, and Otto Böttger, Frankfurt am Main, Germany, assignors to Licentia Patent-Verwaltungs-G.m.b.H., Frankfurt am Main, Germany Filed Sept. 25, 1962, Ser. No. 226,124
Claims priority, application Germany, Sept. 27, 1961, L 40,118
7 Claims. (Cl. 136—204)

Figures 1, 1A, 2, 2A, 3:
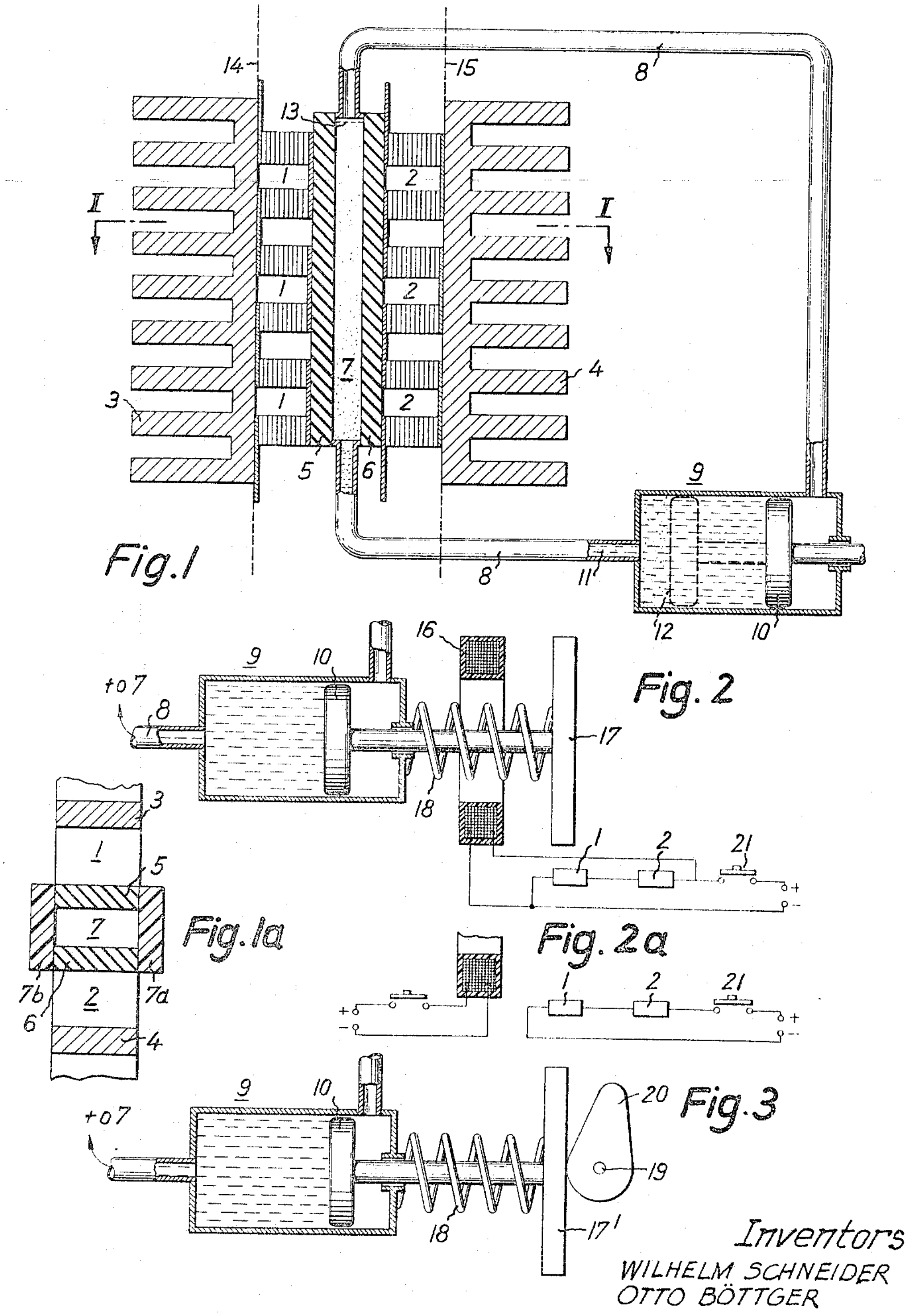

The present invention relates to a thermoelectric device employing either the Peltier or the Seebeck effect.

Devices of that kind usually comprise thermocouples wherein heat exchangers are attached to the hot and cold junctions. The junctions are usually formed by heat conductive members connected to the thermocouple junctions. A large temperature difference is the goal for utilizing the Peltier effect and such temperature difference is a necessity for economically using the Seebeck effect. Accordingly, it is necessary to thermally insulate from each other junctions kept at different temperatures. Letting aside for the moment temperature measurements, one also will reduce as much as possible the inner electric resistivity of the junctions.

The aforementioned operating conditions are also valid for cascaded thermoelectric devices, particularly employed for Peltier cooling. Since any heat conductive elements are to have a low heat resistivity, and since for economical reasons the number of stages is to be kept small, and since each stage is preferably composed of several thermocouples, thermally connected in parallel, so that a large amount of heat can be transported, there is inherently present a large number of "thermal resistors" having high heat conductivity and being connected in parallel. Consequently, in a Peltier cooler a once existing temperature gradient is rapidly reduced and equalized when the electric current fed to the thermocouples is interrupted. This disadvantage could be remedied in maintaining an electric current after the desired temperature difference has been attained, which current is just sufficient to compensate heat backflow and Joulean heat losses. Such provision, however, reduces considerably the economy of Peltier cooling.

It is an object of the present invention to overcome the aforementioned difficulties and disadvantage and to suggest a novel, cascaded thermoelectric device in which the heat conduction between the several stages can easily be interrupted.

It is a further object of the present invention to provide for a new and improved cascaded thermoelectric device in which no permanent current is required to flow through the thermoelectric elements in order to maintain for a considerable period of time an effective temperature gradient.

According to one aspect of the present invention in a preferred embodiment thereof it is suggested not to directly interconnect the thermocouples of two thermoelectric cascades, but to first provide for means defining a cavity; separated wall portions of this cavity are then placed in heat conductive relationship with the hot junctions of one stage and with the cold junctions of the other stage; the cavity further is inserted in a pipe line. A heat conductive liquid is permitted to enter or to be discharged from the cavity in response to a control element such as a cylinder-piston arrangement. The piston can be operated concurrently with or in direct dependancy upon the flow of electric current through the thermocouples. Thus, whenever there is no electric current flowing through the thermoelectric device, the liquid is to be discharged from the cavity so as to interrupt the heat conduction between the two stages. If the thermal electric device operates as a refrigerator by way of Peltier cooling, the interior of the refrigerator will not be heated up any more via the cascade, since the heat conduction between the two stages is interrupted. The liquid, so as to say, operates as a thermal switch.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

FIG. 1 illustrates a cross section of a two stage thermoelectric cascade with a schematic diagram of a controlling cylinder-piston device;

FIG. 1*a* illustrates a cross section along lines I—I of FIG. 1;

FIG. 2 illustrates a cross section through a piston control device with a thermatically shown electric circuit diagram employable in a device shown in FIG. 1 and 1*a*;

FIG. 2*a* illustrates a modified circuit diagram for controlling a piston control device shown in FIG. 1; and FIG. 3 illustrates a modified control device for the piston of FIG. 1.

In FIG. 1, reference numerals 1 and 2 respectively denote the thermoelectric elements or thermocouple elements respectively pertaining to two thermoelectric stages. Each thermoelectric element is depicted so that in the drawing its left side is part of a cold junction of two adjoining elements while its right side is part of a respective hot junction. Accordingly, all of the cold junctions of thermoelectric elements 1 are heat conductively connected to a heat exchanger 3 being provided with ribs so as to enlarge its surface, while the hot junctions of elements 2 are heat conductively connected to a similarly shaped heat exchanger 4. In between the elements 1 and 2 there is a two-part element composed of portions 5 and 6 heat conductively connected to or engaged with the hot junctions of thermoelectric elements 1 and the cold junctions of thermoelectric elements 2, respectively. Elements 5 and 6 are preferably made of electrical insulating material so as to prevent short circuiting across the inner thermocouple elements of a stage; they define two opposite walls of a cavity 7. The cross section of cavity 7 depends upon the arrangement and configuration of the thermoelectric elements employed. In the example illustrated, cavity 7 is of rectangular cross section. Cavity 7 is completed by two heat-insulating elements **7*a* and 7*b*** (see FIG. 1*a*) interconnecting elements 5 and 6 but preventing heat flow therebetween. Eventually, elements **7*a* and 7*b* can be a part of a general heat insulator positioned between the space communicating with heat exchanger 3 and the space communicating with heat exchanger 4, for example the exterior and the interior of a refrigerator, respectively. The space defined by dashed lines 14 and 15 can therefore be filled with a foam rubber mass (including elements 7*a* and 7*b***) forming part of a refrigerator wall.

Preferably the heat capacity of element 3 is larger than that of 5 and the heat capacity of element 4 is larger than that of element 6.

Cavity 7 is an element within a conduit system 8 further including a cylinder 9 which is partitioned by a piston 10 slidably disposed in cylinder 9. In the drawing, the lefthand portion of cylinder 9 is filled with a liquid 11 and is connected to the lower end or inlet of cavity 7 by means of a tube pertaining to conduit system 8 and being likewise filled with liquid. As illustrated, the liquid does not fill the entire cavity 7. Preferably, the liquid 11 is an electric insulator and is chemically inert with respect to the material employed with which it comes into contact (elements 5, 6, 8, 9 and 10). As liquid one can use for example oil. Alternatively, the liquid may be mercury in which case the cavity 7 can also be used as an auxiliary mercury switch governing, for example, an indicating lamp to show that in fact the cavity 7 is charged with liquid or that the liquid has been discharged therefrom. Depending upon the pressure characteristics of the vapor from the liquid 11, the remaining portion of conduit system 8 can be evacuated.

If the piston 10 is in the particular position shown, no liquid is in cavity 7 as stated, and there is practically no heat flow existing between elements 5 and 6 and between the two stages defined by thermoelectric elements 1 and 2. If piston 10 is shifted into the alternative position indicated by dotted lines 12, the liquid enters cavity 7 up to a level 13. Thus, elements 5 and 6 or 1 and 2 are now heat conductively interconnected. In every intermediate position of piston 10 there is a more or less effective heat conductive connection established between elements 1 and 2 taken as a whole.

The drive of piston 10 can be connected mechanically to the switch governing the electric current fed to the thermoelectric elements. Furthermore, a safety provision can be made in controlling the piston by a magnet in such a manner that the piston 13 shifted into the illustrated position (cavity 7 then being empty) whenever there is an electric power failure. This will be explained more fully below.

FIG. 2 depicts a control device actuating piston 10 whenever the electric supply current is interrupted, either intentionally or inadvertently. Numeral 16 denotes a ring shaped magnet electrically connected in parallel to the series connected thermoelectric elements 1 and 2 and governed by a switch 21 thereof. Switch 21 may be a simple, manually operated switch, but it may also be a temperature controlled switch or both; for example, if Peltier cooling is used in a refrigerator, switch 21 may be controlled by the temperature sensing element inside of the refrigerator.

Alternatively, elements 1 and 2 may be connected in parallel, which depends upon the dimensioning of the individual thermoelement, the number of elements in each stage, and for the supply voltage.

Magnet 16 cooperates with an armature plate 17 secured to piston 10 and biased by a spring 18. Whenever there is an electric current flowing in the system, switch 21 then being closed, electromagnet 16 attracts armature plate 17 and urges piston 10 against the force of spring 18 towards the left, thereby forcing liquid into cavity 7. If the electric current is interrupted for any reason, the expanding spring 18 pushes plate 17 towards the right followed by piston 10 whereby cavity 7 is emptied.

FIG. 2*a* shows, that electrically the thermoelements 1 and 2 can be completely separated from the energization circuit for electromagnet 16.

FIG. 3 depicts a simplified control device for piston 10, effective only in direct cooperation with the switch governing the current fed to the thermoelectric elements. The switch (not shown) and its manual control element may be mounted on a shaft 19 carrying a cam 20. For operation shaft 19 is turned counterclockwise and cam 20 urges plate 17′ towards the left, against the force of spring 18. When the switch is turned off, spring 18 keeps plate 17′ in engagement with receding cam 20 and piston 10 moves back towards the right thus emptying cavity 7.

The invention is not limited to the embodiments described above but all changes and modifications thereof not constituting departments from the spirit and scope of the invention are intended to be covered by the following claims.

What is claimed is:

1. In a thermoelectric device, the combination comprising: a first and a second thermocouple each having a hot junction and a cold junction; a first heat conductive element connected in a heat conductive manner to the hot junction of said first couple; a second heat conductive element connected in a heat conductive manner to the cold junction of said second couple, said first and second elements defining a cavity disposed between, and thermally communicating, through said elements, with, said thermocouples, said cavity having an inlet; conduit means communicating with said cavity via said inlet; a heat conductive liquid in said conduit; and control means connected to said conduit means for selectively charging said cavity with said liquid and discharging it therefrom.

2. In a thermoelectric device, the combination comprising: a first and a second thermocouple each having a hot junction and a cold junction; a first heat conductive element connected in a heat conductive manner to the hot junction of said first couple; a second heat conductive element connected in a heat conductive manner to the cold junction of said second couple, said first and second elements defining a cavity disposed between, and thermally communicating, through said elements, with, said thermocouples, said cavity having an inlet; conduit means communicating with said cavity via said inlet; a predetermined quantity of mercury in said conduit; and control means connected to said conduit means for selectively charging said cavity with a portion of said mercury and discharging it therefrom.

3. In a thermoelectric device, the combination comprising: a first and a second thermocouple each having a hot junction and a cold junction; a first heat conductive element connected in a heat conductive manner to the hot junction of said first couple; a second heat conductive element connected in a heat conductive manner to the cold junction of said second couple, said first and second elements defining a cavity disposed between, and thermally communicating, through said elements, with, said thermocouples, said cavity having an inlet; conduit means communicating with said cavity via said inlet; a heat conductive, electrically insulating liquid in said conduit; and control means connected to said conduit means for selectively charging said cavity with said liquid and disharging it therefrom.

4. In a thermoelectric device, the combination comprising: a first and a second thermocouple each having a hot junction and a cold junction; a first heat conductive element connected in a heat conductive manner to the hot junction of said first couple; a second heat conductive element connected in a heat conductive manner to the cold junction of said second couple, said first and second elements defining a cavity disposed between, and thermally communicating, through said elements, with, said thermocouples, said cavity having an inlet; conduit means communicating with said cavity via said inlet; a heat conductive liquid in said conduit; and control means operated simultaneously with the electric current supply for said thermocouples for selectively charging said cavity with said liquid and discharging it therefrom.

5. In a thermoelectric device, the combination comprising: a first and a second thermocouple each having a hot junction and a cold junction; a first heat conductive element connected in a heat conductive manner to the hot junction of said first couple; a second heat conductive element connected in a heat conductive manner to the cold junction of said second couple, said first and second elements defining a cavity disposed between, and thermally communicating, through said elements, with, said thermocouples, said cavity having an inlet; conduit means communicating with said cavity via said inlet; a heat conductive liquid in said conduit; electric control means, electrically connected to said thermocouples for selectively charging said cavity with said liquid and discharging it therefrom; and a switch for governing the current supply to said thermocouples and to said control means.

6. A thermoelectric device, comprising: a first and a second plurality of thermocouples, with each thermocouple having a hot junction and a cold junction; a first heat conductive element heat conductively connected to all hot junctions of said first plurality of couples; a second heat conductive element heat conductively connected to all cold junctions of said second plurality of couples, said first and second elements defining a cavity disposed between, and thermally communicating, through said elements, with, said thermocouples, said cavity having an inlet; a piston and cylinder arrangement, conduit means interconnecting said cylinder at one side of said piston with said inlet; and a heat conductive liquid in said conduit means capable of entering and leaving said cavity upon piston actuation.

7. In a thermoelectric device, the combination comprising: a first and a second thermocouple each having a hot junction and a cold junction; a heat exchanger connected in a heat conductive manner to the hot junction of said second couple; a first heat conductive element connected in a heat conductive manner to the hot junction of said first couple; a second heat conductive element connected in a heat conductive manner to the cold junction of said second couple and having a heat capacity smaller than the heat capacity of said heat exchanger, said first and second elements defining a cavity disposed between, and thermally communicating, through said elements, with, said thermocouples, said cavity having an inlet; conduit means communicating with said cavity via said inlet; a heat conductive liquid in said conduit; and control means connected to said conduit means for selectively charging said cavity with said liquid and discharging it therefrom.

References Cited by the Examiner

UNITED STATES PATENTS

| | | | |
|---|---|---|---|
| 2,652,503 | 9/1953 | Pack | 136—4 |
| 3,091,919 | 6/1963 | Coles | 62—3 X |
| 3,127,287 | 3/1964 | Henderson et al. | 136—4 |

WINSTON A. DOUGLAS, *Primary Examiner.*

ALLEN B. CURTIS, *Examiner.*